(12) United States Patent
Tiwari et al.

(10) Patent No.: US 8,649,813 B2
(45) Date of Patent: Feb. 11, 2014

(54) LATENCY IMPROVEMENT METHODS IN NATIVE PTT GATEWAY FOR A GROUP CALL WITH DISPATCH CONSOLE CLIENTS

(75) Inventors: Nitin K. Tiwari, San Diego, CA (US); Rajan Verma, San Diego, CA (US); Karthik Balu, San Diego, CA (US); Bryant K. Forsgren, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 149 days.

(21) Appl. No.: 12/753,635

(22) Filed: Apr. 2, 2010

(65) Prior Publication Data

US 2010/0261494 A1     Oct. 14, 2010

Related U.S. Application Data

(60) Provisional application No. 61/168,860, filed on Apr. 13, 2009.

(51) Int. Cl.
*H04B 7/00* (2006.01)

(52) U.S. Cl.
USPC ............................. 455/518; 455/517; 455/519

(58) Field of Classification Search
USPC .................................................. 455/517–519
See application file for complete search history.

(56) References Cited

U.S. PATENT DOCUMENTS

| | | | |
|---|---|---|---|
| 6,731,609 B1 | 5/2004 | Hirni et al. | |
| 7,684,818 B1 * | 3/2010 | Gates et al. | 455/521 |
| 2005/0174951 A1 * | 8/2005 | Schrader et al. | 370/260 |
| 2005/0213733 A1 | 9/2005 | Rodman et al. | |
| 2006/0052130 A1 * | 3/2006 | Choksi | 455/552.1 |
| 2006/0063551 A1 | 3/2006 | Martin et al. | |
| 2006/0189337 A1 * | 8/2006 | Farrill et al. | 455/518 |
| 2007/0110029 A1 * | 5/2007 | Gilmore et al. | 370/352 |
| 2007/0123284 A1 * | 5/2007 | Schliwa-Bertling et al. | 455/518 |
| 2007/0133435 A1 * | 6/2007 | Eneroth et al. | 370/260 |
| 2007/0239885 A1 * | 10/2007 | Vadlakonda et al. | 709/232 |
| 2012/0077536 A1 | 3/2012 | Goel et al. | |

FOREIGN PATENT DOCUMENTS

| | | |
|---|---|---|
| EP | 1916607 | 4/2008 |
| WO | WO2007089383 | 8/2007 |

OTHER PUBLICATIONS

International Search Report and Written Opinion—PCT/US2010/030815, International Search Authority—European Patent Office—Aug. 3, 2010.

* cited by examiner

*Primary Examiner* — Bobbak Safaipour
(74) *Attorney, Agent, or Firm* — Raphael Freiwirth (57) ABSTRACT

A system and method for pre-allocating PTT resources including user/resource credentials at the native PTT gateway are presented. The user status and floor control information can be buffered at the native PTT gateway until the native PTT gateway receives actual resource/end point information from the media handler. Afterwards, the pre-allocation of PTT resources can be correctly mapped to the actual user resources/end point information when the native PTT gateway receives such information from the media handlers and a call is handled.

46 Claims, 8 Drawing Sheets

LATENCY IMPROVEMENT METHODS IN NATIVE PTT GATEWAY FOR A GROUP CALL WITH DISPATCH CONSOLE CLIENTS

CLAIM OF PRIORITY UNDER 35 U.S.C. §119

The present Application for Patent claims priority to Provisional Application No. 61/168,860 entitled "LATENCY IMPROVEMENT METHODS IN NATIVE PTT GATEWAY FOR A GROUP CALL WITH DISPATCH CONSOLE CLIENTS" filed Apr. 13, 2009, and assigned to the assignee hereof and hereby expressly incorporated by reference herein.

BACKGROUND OF THE INVENTION

1. Field of the Invention

The embodiments of the invention relates to latency improvement methods in a native push-to-talk (PTT) gateway related to group calls with dispatch console clients a wireless communication system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communication network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a given cell, etc.), similar to a broadcast.

In addition to various transmission schemes (e.g., unicast, multicast, broadcast) that may be used, the PTT call may also be a half duplex or a full duplex communication for at least some of the participants. Generally, a PTT call corresponds to a server mediated communication between two or more identified access terminals, regardless of the various configurations used to conduct the PTT calls.

SUMMARY

In an embodiment, a network communications entity may receive from an originator wireless communications device a request to initiate a call with a target wireless communications device. The network entity may receive a session request from an access terminal to initiate a call with at least one target access terminal through a dispatch console. The network entity may perform an initial allocation of resources associated with credentials of the at least one target access terminal. The network entity may then receive and buffer session updates from the dispatch console, and then update the initial allocation of resources based upon the buffered session updates. The network communications entity may be an application server and include a dispatch function and a gateway function.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
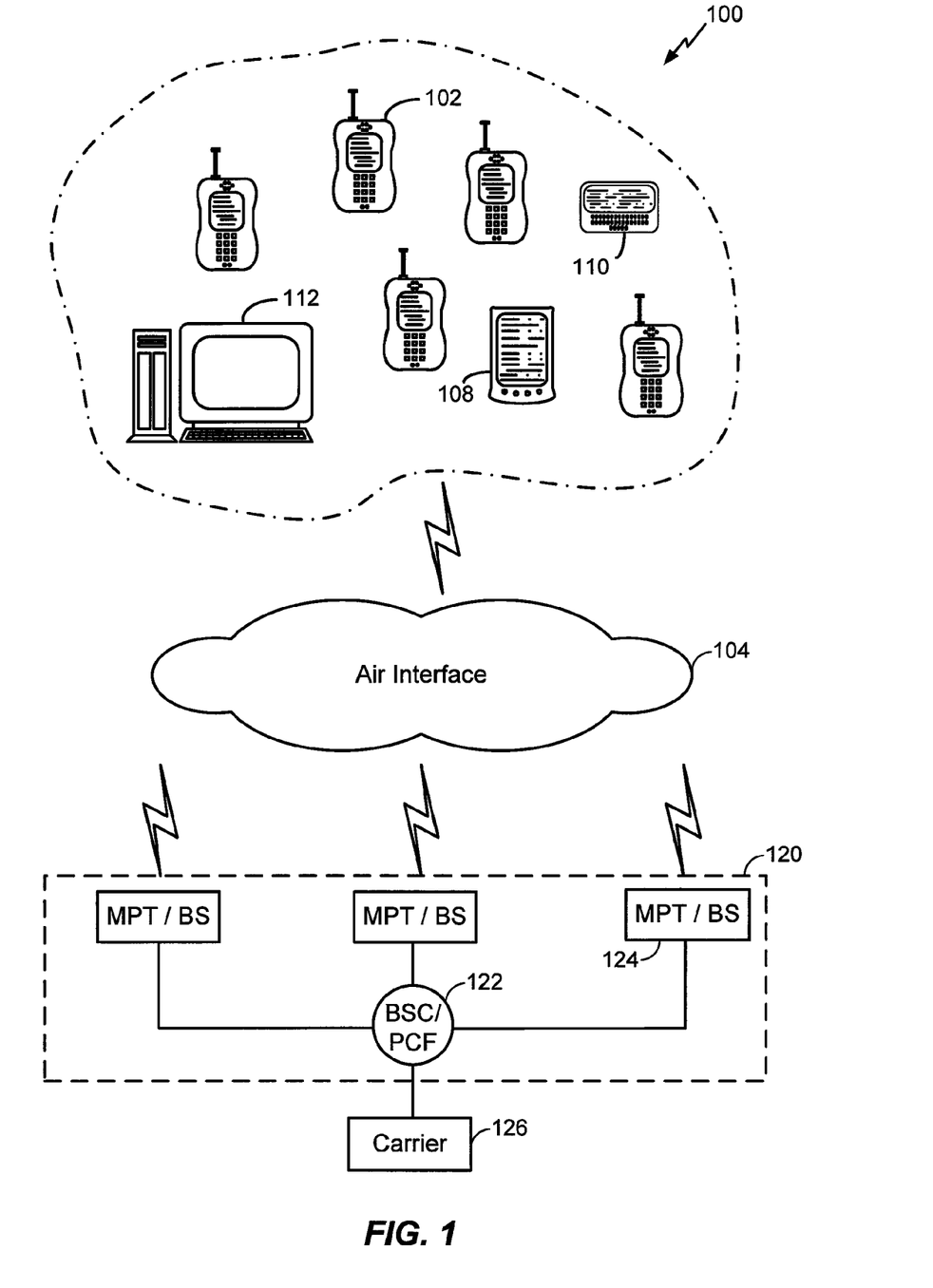
FIG. 1 is a diagram of a wireless network architecture that supports access terminals and access networks in accordance with at least one embodiment of the invention.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as native PTT client computing devices 102, 108, 110, 112 to communicate over-the-air between and among each other and/or between and among components connected via the air interface 104 and RAN 120, including, without limitation, carrier network 126, the Internet, and/or other remote servers. As used herein, a native PTT client may be a Push-To-Talk client that interfaces with the Application Server by mechanisms other than SIP.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102, 108, 110, 112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the embodiments are not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2A:
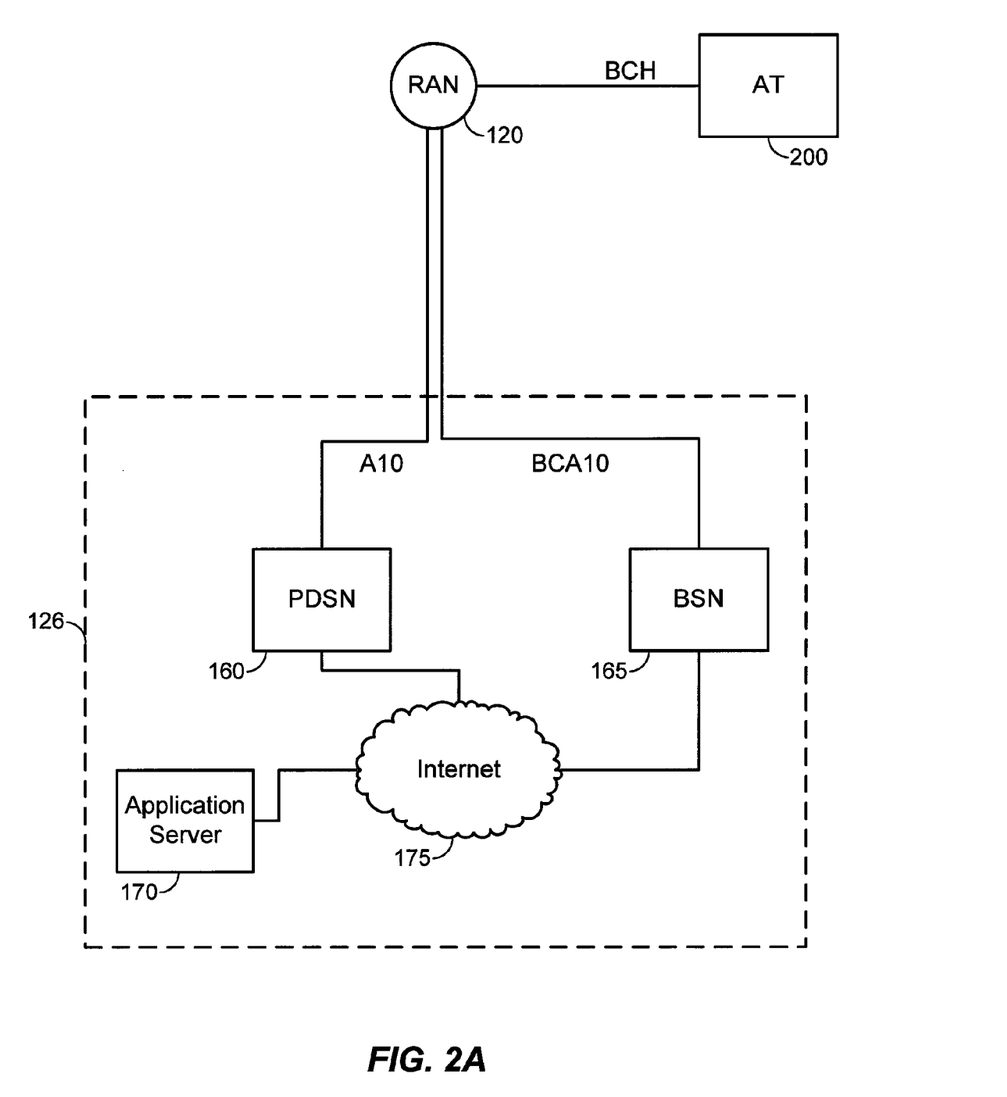
FIG. 2A illustrates the carrier network according to an embodiment of the present invention.

FIG. 2A illustrates the carrier network 126 according to an embodiment of the present invention. In the embodiment of FIG. 2A, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2A, the PDSN 160 may communicate with the RAN 120 (e.g., the BSC/PCF 122 of FIG. 1) via a conventional A10 connection. The A10 connection is well-known in the art and will not be described further for the sake of brevity.

Referring to FIG. 2A, the broadcast serving node (BSN) 165 may be configured to support multicast and broadcast services. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 may send unicast messaging to the PDSN 160 via the Internet 175, and may send multicast messaging to the BSN 165 via the Internet 175.

Figure 2B:
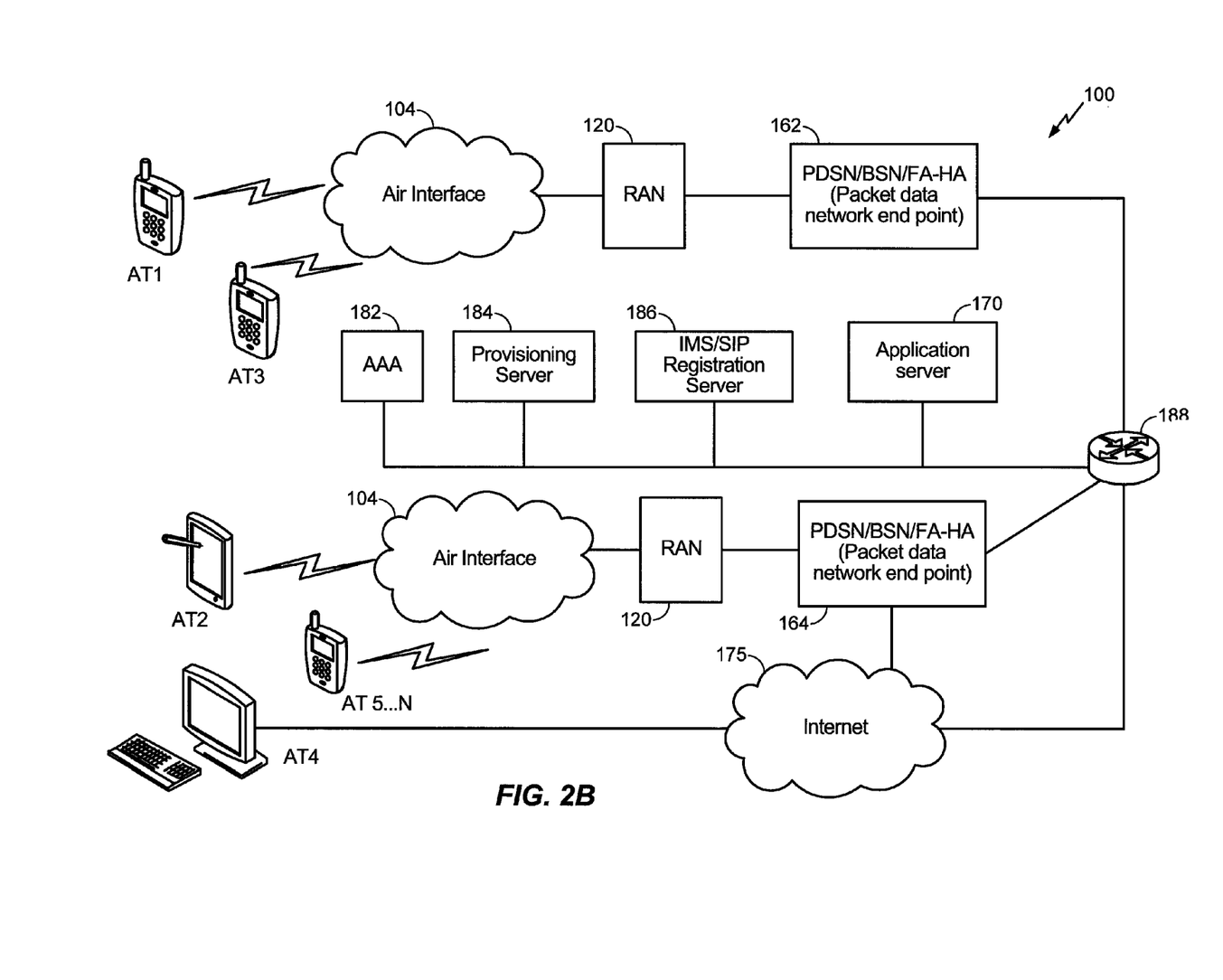
FIG. 2B illustrates an example of the wireless communication of FIG. 1 in more detail.

FIG. 2B illustrates an example of the wireless communication system 100 of FIG. 1 in more detail. In particular, referring to FIG. 2B, ATs 1 . . . N are shown as connecting to the RAN 120 at locations serviced by different packet data network end-points. Accordingly, ATs 1 and 3 connect to the RAN 120 at a portion served by a first packet data network end-point 162 (e.g., which may correspond to PDSN 160, BSN 165, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. ATs 2 and 5 . . . N connect to the RAN 120 at a portion served by a second packet data network end-point 164 (e.g., which may correspond to PDSN 160, BSN 165, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. AT 4 connects directly to the Internet 175, and through the Internet 175 can then connect to any of the system components described above.

Referring to FIG. 2B, ATs 1, 3 and 5 . . . N are illustrated as wireless cell-phones, AT 2 is illustrated as a wireless tablet-PC and AT 4 is illustrated as a wired desktop station. However, in other embodiments, it will be appreciated that the wireless communication system 100 can connect to any type of AT, and the examples illustrated in FIG. 2B are not intended to limit the types of ATs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Figure 3:
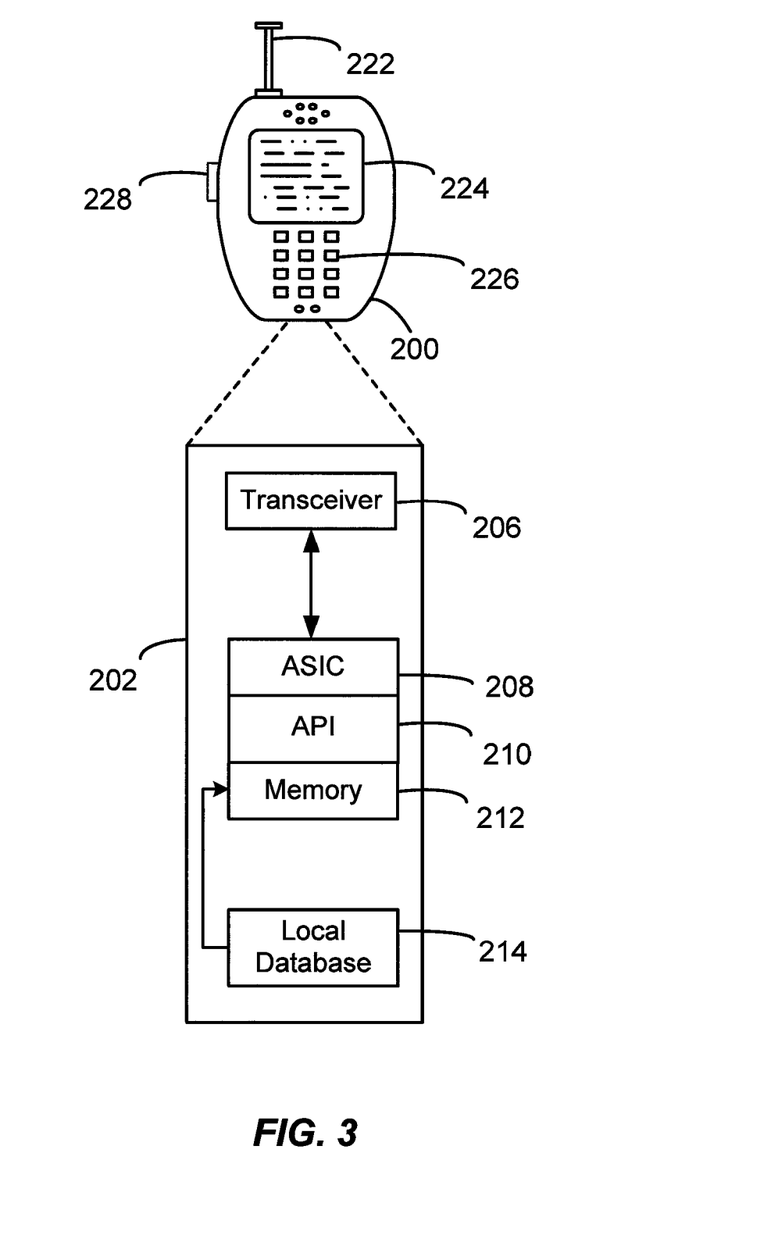
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API') 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), orthogonal frequency division multiple access (OFDMA), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Figure 4:
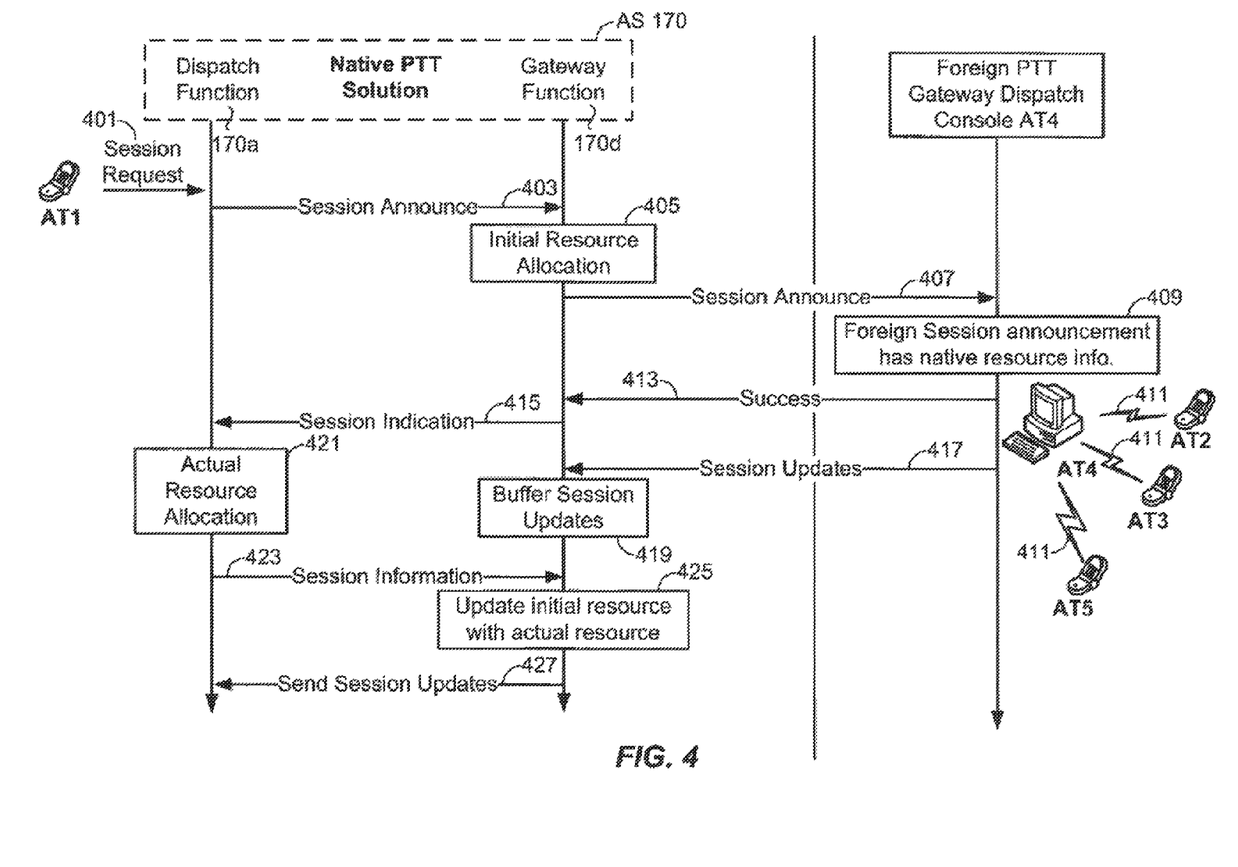
FIG. 4 illustrates an exemplary network illustrating a dispatch console (DC) AT4 communicating with AT1.

Referring to FIG. 4, an exemplary network illustrating a dispatch console (DC) AT4 communicating with AT1. An access terminal AT1 may communicate with dispatch console (DC) AT4 and access terminals AT2 and AT5 via application server (AS) 170. Furthermore, the application server 170 may include a dispatch function 170a and a gateway function 170d. Also, while the dispatch function 170a and the gateway function 170d are each illustrated as structurally separate servers, one or more of these servers may be consolidated in at least one embodiment of the invention. While portions of FIG. 4 are described with respect to SIP, it will be appreciated that other embodiments can be implemented in accordance with protocols other than SIP.

Referring to FIG. 4, the DC AT4 may monitor group call (e.g., a call that potentially includes more than two calling parties). In this embodiment, a PTT application or client may reside on DC AT4 along with the gateway function 170d. The DC AT4 can have special privileges; for example, the ability to monitor calls, the ability to join multiple calls simultaneously, and the ability to allow a DC user to switch/join/leave multiple calls. The DC AT4 may be deployed at control rooms and other critical locations and can be operated by a user who someone who has a broad authority/view of the PTT groups/environment. Further, the DC AT4 may also have a User Interface (UI) which can facilitate any of the above functions.

Referring to FIG. 4, AT1 can make a PTT call and the dispatch function 170a subsequently receives and forwards a session request. The gateway function 170d can pre-allocate or initialize user/resource allocation and can send out a session announcement to a foreign PTT gateway (DC AT4). The foreign PTT gateway DC AT4 can avoid call latency by not waiting for native PTT user/media credentials to arrive before proceeding with session paging. The gateway function 170d may contain a buffer that can be used to buffer user status and floor control information until the gateway function 170d receives the actual resource/end point information from the media handler or dispatch function 170a. The pre-allocation of resources could be correctly mapped to the actual user/resource credentials when a call is handled and the gateway function 170d receives such information from the media handlers or dispatch function 170d.

Access terminal AT1 may make a call to dispatch console users AT2 and AT5 by sending a session request message to the dispatch function 170a, 401. The dispatch function 170a can forward the request by sending a session announce message to the gateway function 170d, 403.

Next, the gateway function 170d can perform initial resource allocation such that some or all credentials are in place for the foreign PTT gateway DC AT4 to page (session announce) the target access terminals (e.g., the called phones), 405. The initial resource allocation can be a component that handles media ports at the data side and floor control. The initial resource allocation can include user credential information and Real-Time Protocol (RTP) and SIP unique identifiers (e.g. "port" and "host" information).

Afterwards, the gateway function 170d can send a session announce message to the foreign PTT gateway DC AT4, 407. The session announce message is received by the foreign PTT gateway DC AT4 and may contain native resource information, 409.

Subsequently, the foreign PTT gateway DC AT4 can page the dispatch console users AT2 and AT5, 411. The foreign PTT gateway DC AT4 can send a success message to the gateway function 170d, 413. Next, the gateway function 170d can send session indication information to the dispatch function 170a, 415. Afterwards, the foreign PTT gateway DC AT4 can send session updates to the gateway function 170d, 417. For example, the session updates can include messages indicating that specific users want to join the call/leave the call, and/or a specific user is busy, etc.

Subsequently, the session updates sent by the foreign PTT gateway DC AT4 are stored in a buffer, 419. The session update information is buffered because the gateway function 170d does not have the native phone's information session information. The buffer can enable the gateway function 170d to buffer all received messages until call set up is completed. Further, this can include all call status messages originated from either the gateway function 170d or from the foreign PTT gateway DC AT4. For example, in a gateway originated PTT group call, the buffer can hold the transmission of all messages until a success message is received from the foreign PTT gateway DC AT4 which allows for signal synchronization between the native PTT (AT1) and dispatch console users AT2 and AT5. Furthermore, the buffer can operate like a first-in first-out (FIFO) queue which is checked every time a status or a floor control message is received/queued and the first message in the queue is sent out. A message is removed from the queue after a successful acknowledgement from the receiver of the message. The queue also helps with serialization of messages before moving into a call established state.

The dispatch function 170a can perform actual resource allocation, 421. The actual resource allocation can include user credential information (Internet Protocol (IP) Addresses, unique user identifiers (UID) and Real-Time Protocol (RTP) and SIP unique identifiers (e.g. "port" and "host" information).

Next, the dispatch function 170a can send session information to the gateway function 170d, 423. For example, the session information can include handset information about the various users, port numbers and information, IP addresses, UID, etc.

Afterwards, the gateway function 170d can update the initial resource allocation with the actual resource information, 425. In one exemplary embodiment, the update of the actual resource information includes a mapping function that places the actual resource information into the initial resource allocation.

The gateway function 170*d* can send session updates to the dispatch function 170*a*, 427.

Figure 5:
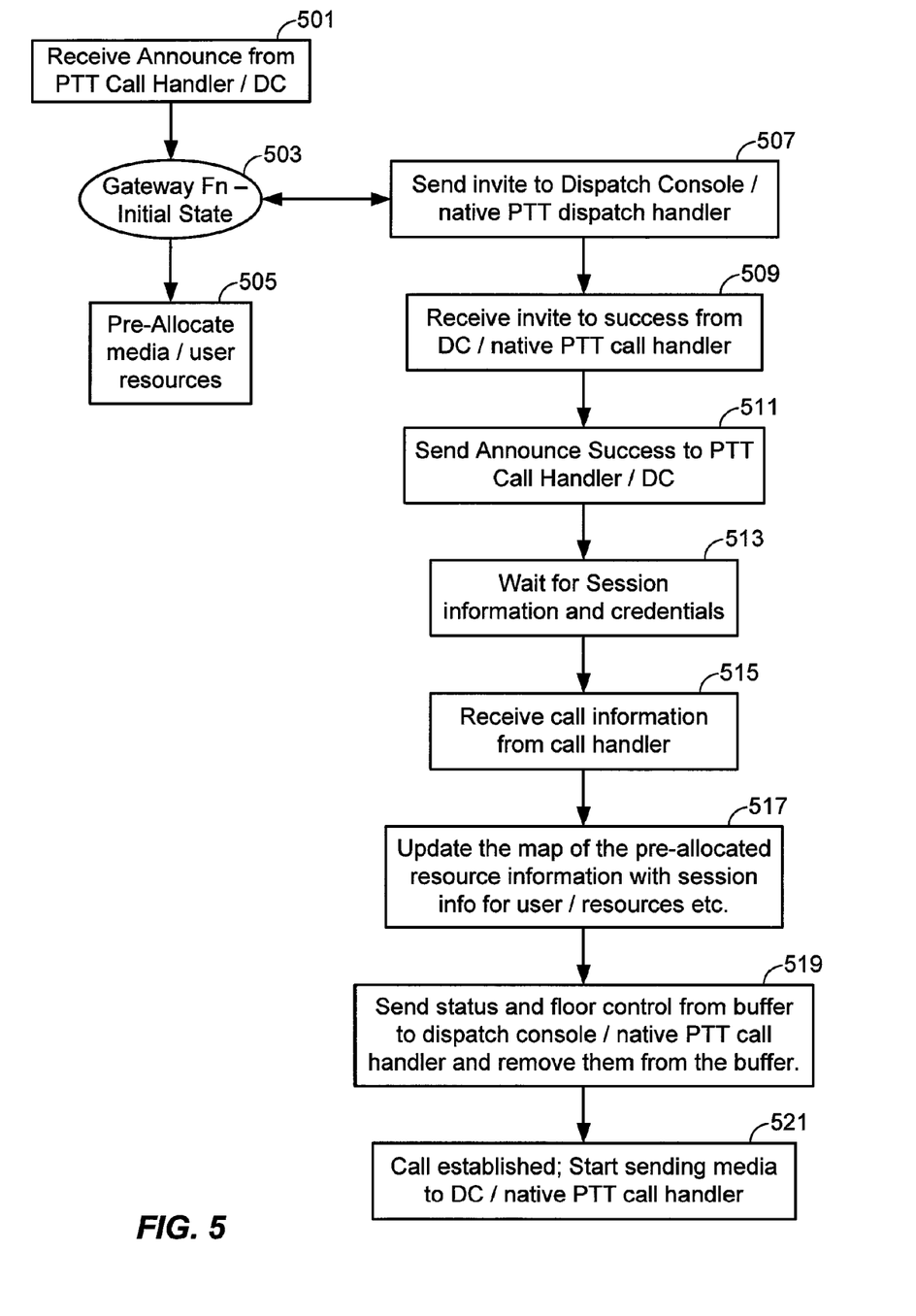
FIG. 5 illustrates an exemplary state chart of the exemplary system described in FIG. 4.

Referring to FIG. 5, a state chart of the system described in FIG. 4 is illustrated. The state chart is started when a session announce message is received from the gateway function 170*d*, 501. Next, the gateway function 170*d* enters an initial state, 503. The gateway function 170*d* can perform initial resource allocation such that some or all credentials are in place for the foreign PTT gateway DC AT4 to page (session announce) target access terminals (e.g., the called phones), 505. Afterwards, the gateway function 170*d* can send an invite message to the foreign PTT gateway DC AT4, 507. The invite message is received by the foreign PTT gateway DC AT4 and may contain native resource information, 509.

The gateway function 170*d* can send session indication information which may include announce success information to the dispatch function 170*a*, 511. Next, session updates sent by the foreign PTT gateway DC AT4 which may include call status or floor control messages are stored in a buffer, 513. Afterwards, session information and credentials can be sent to the gateway function 170*d*, 515. For example, the credentials can include buffer status and floor control. Subsequently, the gateway function 170*d* can receive call information from the call handler or dispatch function 170*a*, 517. The call information can include the updated actual resource allocation.

The gateway function 170*d* can update the initial resource allocation with the actual resource information, 519. In one exemplary embodiment, the update of the actual resource information includes a mapping function that places the actual resource information into the initial resource allocation.

Next, the gateway function 170*d* can send status/session updates to the call handler or dispatch function 170*a* and the foreign PTT gateway DC AT4, 521. Afterwards, the call is established and the gateway function 170*d* can send media to the call handler or dispatch function 170*a* and the foreign PTT gateway DC AT4, 523.

Figure 6:
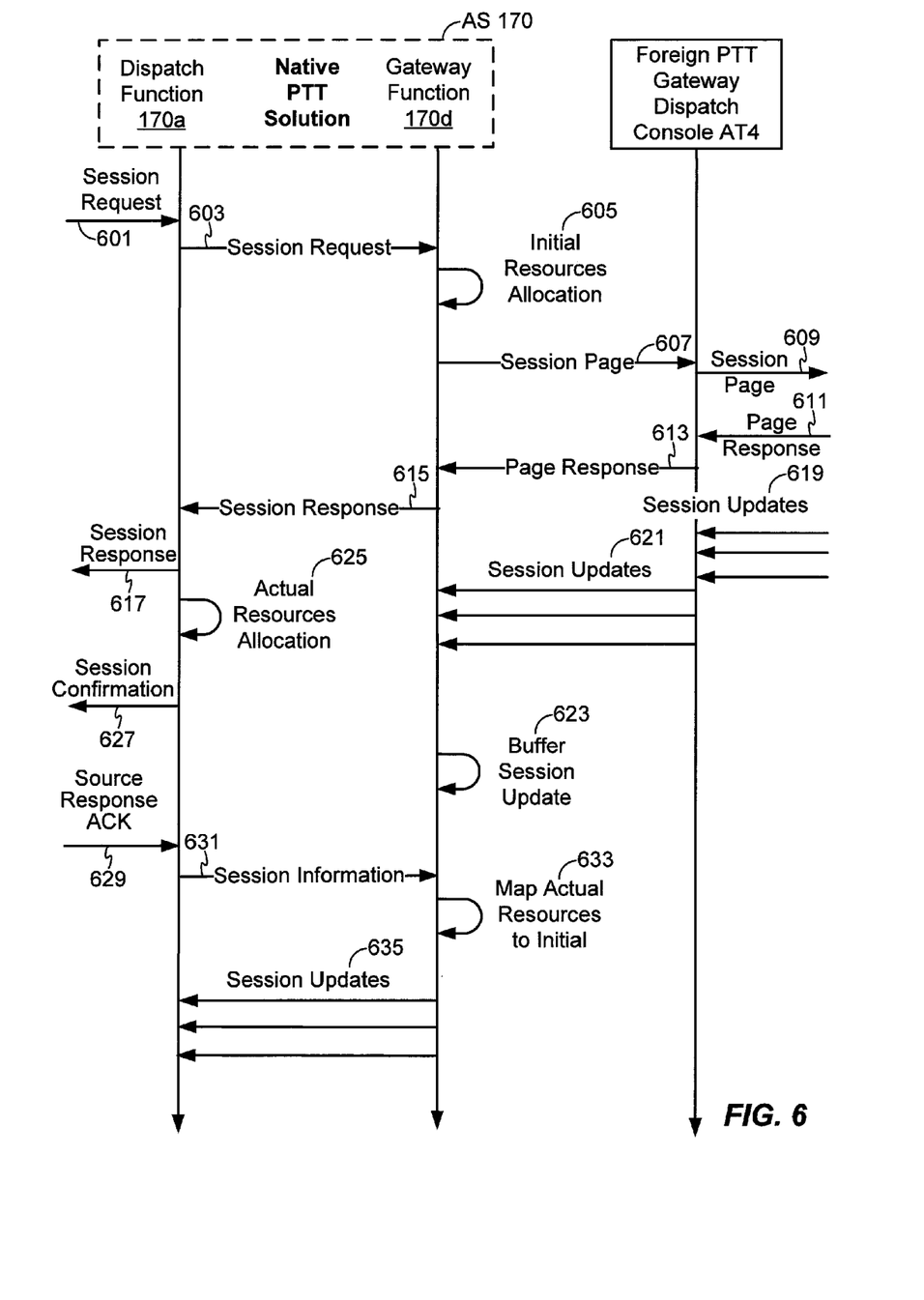
FIG. 6 illustrates an exemplary call flow utilizing latency improvement for an exemplary group call.

Referring to FIG. 6, an exemplary call flow is illustrated where latency improvement is employed for a group call for an exemplary embodiment. Accordingly, a dispatch function 170*a* receives a session request message, 601. Next, the dispatch function 170*a* can forward the request by sending a session request message to the gateway function 170*d*, 603.

The gateway function 170*d* can perform initial resource allocation such that some or all credentials are in place for the foreign PTT gateway DC AT4 to page (session announce) the called phones, 605. The initial resource allocation can be a component that handles media ports at the data side and floor control. The initial resource allocation can include user credential information and Real-Time Protocol (RTP) and SIP unique identifiers (e.g. "port" and "host" information).

Afterwards, the gateway function 170*d* can send a session page message to the foreign PTT gateway DC AT4, 607. The session page message is received by the foreign PTT gateway DC AT4 and is forwarded to any dispatch console users AT2 and AT5, 609. The session page message may contain native resource information. Subsequently, the foreign PTT gateway DC AT4 can receive a page response message from any dispatch console users AT2 and AT5, 611.

The foreign PTT gateway DC AT4 can send a page response message to the gateway function 170*d*, 613. Next, the gateway function 170*d* can send a session response message to the dispatch function 170*a*, 615. The dispatch function 170*a* can send a session response message, 617.

Afterwards, the foreign PTT gateway DC AT4 can receive session updates, 619. For example, the session updates can include messages indicating that specific users want to join the call/leave the call, and/or a specific user is busy, etc. The foreign PTT gateway DC AT4 can send session updates to the gateway function 170*d*, 621. Subsequently, the session updates sent by the foreign PTT gateway DC AT4 are stored in a buffer, 623.

The dispatch function 170*a* can perform actual resource allocation, 625. The actual resource allocation can include user credential information (Internet Protocol (IP) Addresses, unique user identifiers (UID) and Real-Time Protocol (RTP) and SIP unique identifiers (e.g. "port" and "host" information).

Next, the dispatch function 170*a* can send a session confirmation message, 627. The dispatch function 170*a* can receive a source response acknowledgment (ACK) message, 629. Afterwards, the dispatch function 170*a* can send session information to the gateway function 170*d*, 631. The gateway function 170*d* can update the initial resource allocation with the actual resource information, 633. In one exemplary embodiment, the update of the actual resource information includes a mapping function that places the actual resource information into the initial resource allocation. Next, the gateway function 170*d* can send session updates to the dispatch function 170*a*, 635.

Figure 7:
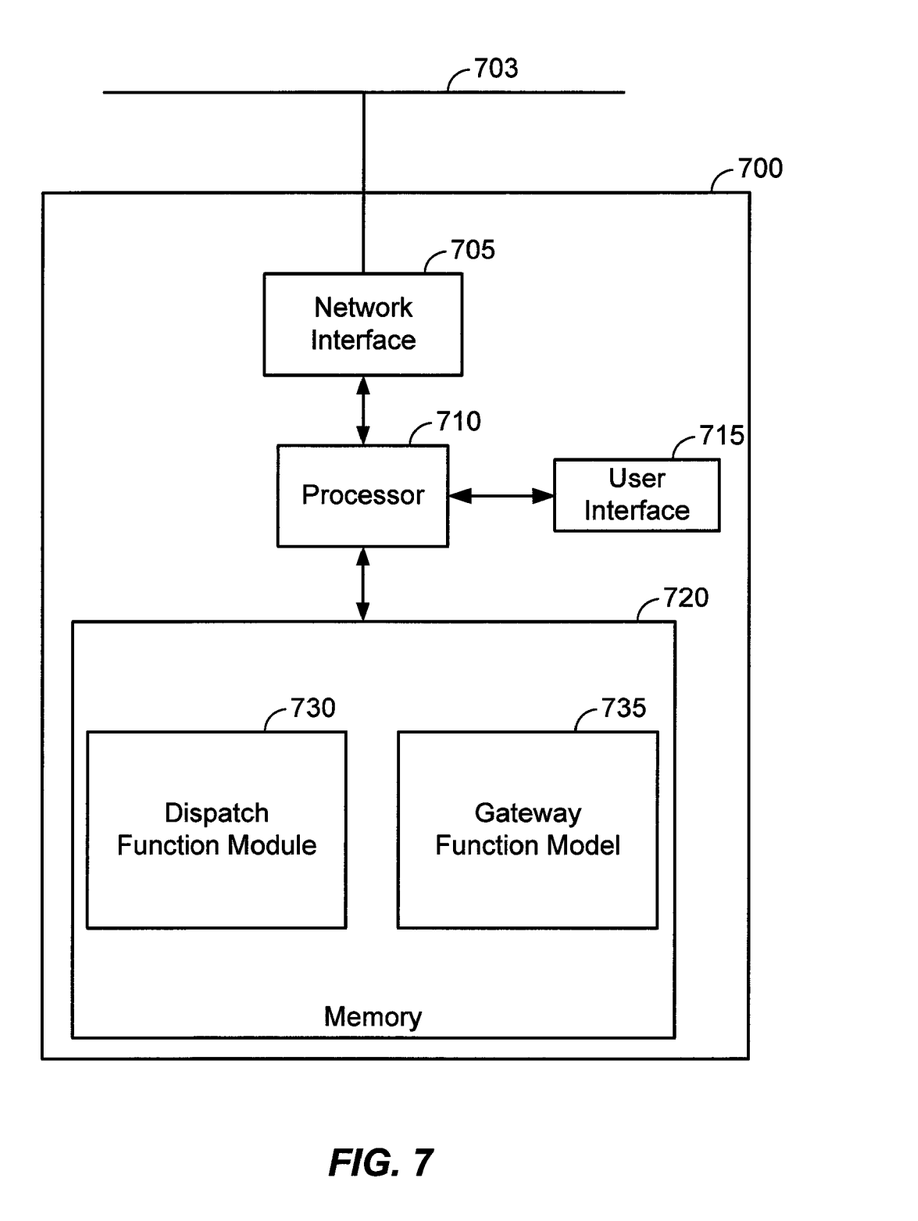
FIG. 7 is a block diagram illustrating an exemplary embodiment of an application server.

FIG. 7 is a block diagram illustrating one exemplary embodiment of an application server 700. The application server 700 may be a separate device which can be present on a server-side LAN 730, wherein it functionality is discussed above. For the sake of simplicity, the various features and functions illustrated in the block diagram of FIG. 7 are connected together using a common bus which is meant to represent that these various features and functions are operatively coupled together. Those skilled in the art will recognize that other connections, mechanisms, features, functions, or the like, may be provided and adapted as necessary to operatively couple and configure an actual portable wireless device. Further, it is also recognized that one or more of the features or functions illustrated in the example of FIG. 7 may be further subdivided or two or more of the features or functions illustrated in FIG. 7 may be combined.

The application server 700 may include a network interface 705 that may be wired and/or wireless for communicating over the server side LAN. A processor 710 may be connected to the network interface 705, a user interface 715 and memory 720. The processor 710 may include one or more microprocessors, microcontrollers, and/or digital signal processors that provide processing functions, as well as other calculation and control functionality. The processor 710 accesses memory 720 for reading/writing data and/or software instructions for executing programmed functionality. The memory 720 may be on-board the processor 710 (e.g., within the same IC package), and/or the memory may be external memory to the processor and functionally coupled over a data bus.

A number of software modules and/or data tables may reside in memory 720 and be utilized by the processor 710 for resource and session management functionality, including functionality describe above. As illustrated here, within memory 720, the application server 700 may further include or otherwise provide a Dispatch Function Module 730 and/or a Gateway Function Module. While the software modules 730,735 are illustrated in the example as being contained in memory 720, it should be recognized that in certain implementations such procedures may be provided for or otherwise operatively arranged using other or additional mechanisms. For example, all or part of software modules 730,735 may be provided in firmware. Additionally, while in FIG. 7 the software modules 730,735 are shown as a single distinct entity for ease of description, it should be understood that it may include a plurality of modules that are not illustrated, or otherwise be further partitioned into a differing groups of procedures.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, the embodiments of the invention are not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for improving latency in a wireless communications system, comprising:
   receiving a session request from an access terminal to initially establish a call with at least one target access terminal through a dispatch console, the call comprising a voice communication between the access terminal and the at least one target access terminal;
   performing an initial allocation of resources associated with credentials of the at least one target access terminal;
   receiving and buffering session updates from the dispatch console, wherein buffering session updates includes buffering received messages until a setup of the call is completed; and
   updating the initial allocation of resources based upon the buffered session updates.

2. The method of claim 1, further comprising:
   receiving the session request at a dispatch function; and
   sending a session announce message to a gateway function.

3. The method of claim 2, further comprising:
   forwarding the session announce message to the dispatch console; and
   sending a session indication message from the gateway function to the dispatch function.

4. The method of claim 3, wherein updating the initial allocation of resources further comprising:
   allocating actual resources based upon the session indication message;
   sending a session information message from the dispatch function to the gateway function; and
   updating the initial resource allocation with an actual allocation based upon the session information message.

5. The method of claim 4, wherein the allocating actual resources includes allocating a selected one of user credential information, unique user identifiers, Real Time Protocol identifiers, and Session Initiation Protocol identifiers.

6. The method of claim 4, wherein the session information message includes a selected one of access terminal information regarding users, port numbers and information, Internet Protocol (IP) addresses, and User Identifier (UID) information.

7. The method of claim 1, wherein the messages include user or resource credentials for the dispatch console to page the target access terminals.

8. The method of claim 1, wherein the buffering further comprises:
   operating a first-in first-out (FIFO) buffer that is checked every time a status or a floor control message is received and the first message in a queue is sent out.

9. The method of claim 8, further comprising:
   removing a message from the queue after a successful acknowledgement is received.

10. The method of claim 1, wherein the initial allocation of resources further comprises:
    managing media ports and floor control.

11. The method of claim 1, wherein the buffered session updates include call status messages originating from the gateway function or the dispatch console.

12. The method of claim 1, wherein the buffered session updates include messages indicating at least one of specific users joining the call and specific users leaving the call, and an indication that a specific user is busy.

13. The method of claim 1, wherein the updating the initial allocation of resources further comprises:
    mapping the actual resource information into the initial resource allocation.

14. The method of claim 1, wherein the call is a group call, further comprising:
    receiving a plurality of session updates from the dispatch console.

15. A system for improving latency in a wireless communications system, comprising:
    means for receiving a session request from an access terminal to initially establish a call with at least one target access terminal through a dispatch console, the call comprising voice communication between the access terminal and the at least one target access terminal;

means for performing an initial allocation of resources associated with credentials of the at least one target access terminal;

means for receiving and buffering session updates from the dispatch console, wherein means for buffering session updates includes means for buffering received messages until a setup of the call is complete; and means for updating the initial allocation of resources based upon the buffered session updates.

16. The system of claim 15, further comprising:
means for receiving the session request at a dispatch function; and
means for sending a session announce message to a gateway function.

17. The system of claim 16, further comprising:
means for forwarding the session announce message to the dispatch console; and
means for sending a session indication message from the gateway function to the dispatch function.

18. The system of claim 17, wherein the means for updating the initial allocation of resources further comprises:
means for allocating actual resources based upon the session indication message;
means for sending a session information message from the dispatch function to the gateway function; and
means for updating initial resource allocation with an actual allocation based upon the session information message.

19. The system of claim 18, wherein the means for allocating actual resources includes means for allocating a selected one of user credential information, unique user identifiers, Real Time Protocol identifiers, and Session Initiation Protocol identifiers.

20. The system of claim 18, wherein the session information message includes a selected one of access terminal information regarding users, port numbers and information, Internet Protocol (IP) addresses, and User Identifier (UID) information.

21. The system of claim 15, wherein the messages include at least one of user and resource credentials for the dispatch console to page the target access terminals.

22. The system of claim 15, wherein the means for buffering further comprises:
means for operating a first-in first-out (FIFO) buffer that is checked every time a status or a floor control message is received and the first message in a queue is sent out.

23. The system of claim 22, further comprising:
means for removing a message from the queue after a successful acknowledgement is received.

24. The system of claim 15, wherein the means for initial allocation of resources further comprises:
means for managing media ports and floor control.

25. The system of claim 15, wherein the buffered session updates include at least one of call status messages originating from the gateway function and call status messages originating from the dispatch console.

26. The system of claim 15, wherein the buffered session updates include messages indicating at least one of specific users joining or and specific users leaving the call, and an indication that a specific user is busy.

27. The system of claim 15, wherein the means for updating the initial allocation of resources further comprises:
means for mapping the actual resource information into the initial resource allocation.

28. The system of claim 15, wherein the call is a group call, the system further comprises:
means for receiving a plurality of session updates from the dispatch console.

29. A non-transitory computer-readable medium having stored thereon processor-executable instructions configured to cause a processor to perform operations, comprising:
receiving a session request from an access terminal to initially establish a call with at least one target access terminal through a dispatch console, the call comprising voice communication between the access terminal and the at least one target access terminal;
performing an initial allocation of resources associated with credentials of the at least one target access terminal;
receiving and buffering session updates from the dispatch console, wherein buffering session updates includes buffering received messages until a setup of the call is completed; and
updating the initial allocation of resources based upon the buffered session updates.

30. The non-transitory computer-readable medium of claim 29, wherein the stored processor-executable instructions are configured to cause the processor to perform operations further comprising:
receiving the session request at a dispatch function; and
sending a session announce message to a gateway function.

31. The non-transitory computer-readable medium of claim 30, wherein the stored processor-executable instructions are configured to cause the processor to perform operations further comprising:
forwarding the session announce message to the dispatch console; and
sending a session indication message from the gateway function to the dispatch function.

32. The non-transitory computer-readable medium of claim 31, wherein the stored processor-executable instructions are configured to cause the processor to perform operations further comprising:
allocating actual resources based upon the session indication message;
sending a session information message from the dispatch function to the gateway function; and
updating initial resource allocation with an actual allocation based upon the session information message.

33. An apparatus for improving latency in a wireless communications system, comprising:
a processor; and
a memory coupled to the processor, wherein the memory stores instructions causing the processor to perform operations comprising:
receiving a session request from an access terminal to initially establish a call with at least one target access terminal through a dispatch console, the call comprising voice communication between the access terminal and the at least one target access terminal,
performing an initial allocation of resources associated with credentials of the at least one target access terminal,
receiving and buffering session updates from the dispatch console, wherein buffering session updates includes buffering received messages until a setup of the call is completed; and
updating the initial allocation of resources based upon the buffered session updates.

34. The apparatus of claim 33, wherein the memory stores instructions causing the processor to perform operations further comprising:

receiving the session request at a dispatch function; and
sending a session announce message to a gateway function.

35. The apparatus of claim 34, wherein the memory stores instructions causing the processor to perform operations further comprising:
forwarding the session announce message to the dispatch console; and
sending a session indication message from the gateway function to the dispatch function.

36. The apparatus of claim 35, wherein the memory stores instructions causing the processor to perform operations further comprising:
allocating actual resources based upon the session indication message;
sending a session information message from the dispatch function to the gateway function; and
updating initial resource allocation with an actual allocation based upon the session information message.

37. The apparatus of claim 36, wherein the memory stores instructions causing the processor to allocate at least one of user credential information, unique user identifiers, Real Time Protocol identifiers, and Session Initiation Protocol identifiers.

38. The apparatus of claim 36, wherein the session information message includes a selected one of access terminal information regarding users, port numbers and information, Internet Protocol (IP) addresses, and User Identifier (UID) information.

39. The apparatus of claim 33, wherein the buffered session updates include at least one of call status messages originating from the gateway function call status messages originating from the dispatch console.

40. The apparatus of claim 33, wherein the buffered session updates include messages indicating at least one of specific users joining and specific user leaving the call, and an indication that a specific user is busy.

41. The apparatus of claim 40, wherein the messages include at least one of user and resource credentials for the dispatch console to page the target access terminals.

42. The apparatus of claim 33, wherein the memory stores instructions causing the processor to perform operations comprising operating to operate a first-in first-out (FIFO) buffer that is checked every time a status or a floor control message is received and the first message in a queue is sent out.

43. The apparatus of claim 42, wherein the memory stores instructions causing the processor to perform operations comprising removing a message from the queue after a successful acknowledgement is received.

44. The apparatus of claim 33, wherein the memory stores instructions causing the processor to perform operations comprising managing media ports and floor control.

45. The apparatus of claim 33, wherein the memory stores instructions causing the processor to perform operations comprising mapping the actual resource information into the initial allocation of resources.

46. The apparatus of claim 33, wherein the memory stores instructions causing the processor to perform operations comprising receiving a plurality of session updates from the dispatch console.

* * * * *